(12) United States Patent
Kotani et al.

(10) Patent No.: US 12,435,519 B2
(45) Date of Patent: Oct. 7, 2025

(54) CONNECTION STRUCTURE, DECORATION METHOD, AND CONNECTION STRUCTURE BODY SET

(71) Applicant: Panasonic Intellectual Property Management Co., Ltd., Osaka (JP)

(72) Inventors: Yuki Kotani, Osaka (JP); Shozo Oshio, Osaka (JP); Masahiro Nakamura, Tokyo (JP); Tetsushi Konda, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 146 days.

(21) Appl. No.: 18/273,049

(22) PCT Filed: Jan. 20, 2022

(86) PCT No.: PCT/JP2022/001923
§ 371 (c)(1),
(2) Date: Jul. 19, 2023

(87) PCT Pub. No.: WO2022/181127
PCT Pub. Date: Sep. 1, 2022

(65) Prior Publication Data
US 2024/0301701 A1    Sep. 12, 2024

(30) Foreign Application Priority Data
Feb. 24, 2021  (JP) ................... 2021-027970

(51) Int. Cl.
*B32B 3/00*    (2006.01)
*B32B 3/06*    (2006.01)
(Continued)

(52) U.S. Cl.
CPC ............ *E04F 13/0835* (2013.01); *B32B 3/06* (2013.01); *B32B 7/022* (2019.01); *B32B 7/06* (2013.01);
(Continued)

(58) Field of Classification Search
CPC .......... E04F 15/02033; E04F 15/02038; E04F 15/107; E04F 15/102; E04F 15/02;
(Continued)

(56) References Cited

U.S. PATENT DOCUMENTS 6,114,864 A * 9/2000 Soejima ............. G01R 1/07342
324/72.5
7,759,161 B2 * 7/2010 Tanaka ................... H01L 24/81
438/106
(Continued)

FOREIGN PATENT DOCUMENTS

JP    49-016216 A    2/1974
JP    56-074128 U    6/1981
(Continued)

OTHER PUBLICATIONS

International Search Report (ISR) issued on Mar. 15, 2022 in International (PCT) Application No. PCT/JP2022/001923.
(Continued)

*Primary Examiner* — Chi Q Nguyen
(74) *Attorney, Agent, or Firm* — Renner, Otto, Boisselle & Sklar, LLP

(57) ABSTRACT

A connection structure includes: a first structure body and a second structure body which is detachably connected to the first structure body. The first structure body includes a first fitting portion, and the second structure body includes a second fitting portion which is detachably fitted with the first fitting portion. At least one of the first fitting portion or the second fitting portion is an anisotropic elastic structure body
(Continued)

including a periodic structure and having an elasticity which differs depending on a direction. When a fitting direction in which the first fitting portion and the second fitting portion are fitted together is a first direction, and a direction which is orthogonal to the first direction is a second direction, the anisotropic elastic structure body has an elasticity which is greater in the second direction than in the first direction.

17 Claims, 8 Drawing Sheets

(51) Int. Cl.
  *B32B 7/022* (2019.01)
  *B32B 7/06* (2019.01)
  *B32B 27/08* (2006.01)
  *B32B 27/36* (2006.01)
  *B32B 27/40* (2006.01)
  *E04F 13/08* (2006.01)

(52) U.S. Cl.
  CPC ............ *B32B 27/08* (2013.01); *B32B 27/365* (2013.01); *B32B 27/40* (2013.01); *E04F 13/0866* (2013.01); *B32B 2307/51* (2013.01); *B32B 2307/7376* (2023.05); *B32B 2419/00* (2013.01)

(58) Field of Classification Search
  CPC . E04F 15/04; E04F 15/08; E04F 15/10; E04F 15/18; E04F 2201/0115; E04F 2201/042; E04F 2201/0107; E04F 2201/03; E04F 2201/0552; E04F 2201/023; E04F 2201/0525; E04F 2201/0547; E04F 2201/043; E04F 2201/0153; E04F 2201/0138; E04B 5/00; Y10T 428/167
  See application file for complete search history.

(56) References Cited

U.S. PATENT DOCUMENTS

| | | | |
|---|---|---|---|
| 2019/0323234 | A1 | 10/2019 | Watanabe et al. |
| 2020/0080320 | A1 | 3/2020 | Yokoyama et al. |
| 2023/0003015 | A1* | 1/2023 | Boucké ............... E04F 13/0866 |
| 2024/0301701 | A1* | 9/2024 | Kotani ..................... B32B 7/06 |
| 2025/0122730 | A1* | 4/2025 | Boucké ................. B32B 27/304 |

FOREIGN PATENT DOCUMENTS

| | | |
|---|---|---|
| JP | 56-115020 U | 9/1981 |
| JP | 57-143949 U | 9/1982 |
| JP | 10-219853 A | 8/1998 |
| JP | 3168716 U | 6/2011 |
| JP | 3175339 U | 5/2012 |
| JP | 3179908 U | 11/2012 |
| JP | 2017-155583 A | 9/2017 |
| JP | 2019-094723 A | 6/2019 |
| JP | 2019-115748 A | 7/2019 |
| JP | 2019-172988 A | 10/2019 |
| JP | 2020-062775 A | 4/2020 |
| WO | 2018/074218 A1 | 4/2018 |
| WO | 2018/168770 A1 | 9/2018 |

OTHER PUBLICATIONS

Written Opinion issued on Mar. 15, 2022 in International (PCT) Application No. PCT/JP2022/001923.

* cited by examiner

FIG. 8

| | | [Comparative example 1] | [Comparative example 2] | [Comparative example 3] | [Comparative example 4] | [Present embodiment] |
|---|---|---|---|---|---|---|
| Attachment and detachment performance | When inserting | × Difficult to insert | △ Slightly difficult to insert | △ Slightly difficult to insert | ○ Easy to insert | ○ Easy to insert |
| | When removing | × Difficult to remove | △ Slightly difficult to remove | ○ Easy to remove | ○ Easy to remove | ○ Easy to remove |
| Holding performance | Holding force | × Too strong | ○ Strong | × Weak | × Weak | ○ Strong |
| | | | | Flexible | Flexible | |

Recess diameter ≤ protrusion diameter

CONNECTION STRUCTURE, DECORATION METHOD, AND CONNECTION STRUCTURE BODY SET

TECHNICAL FIELD

The present invention relates to a connection structure, a decoration method using the connection structure, and a connection structure body set.

BACKGROUND ART

Conventionally, it is known to use functional construction structures as building materials, such as wall materials, interior materials, floor materials, and ceiling materials. This type of structure includes, for example, a base member serving as a support and a functional layer stacked on the base member (for example, Patent Literature (PTL) 1). The functional layer includes various functions according to the application and purpose.

In such a structure, the functional layer and the base member are fixed to each other with an adhesive. Moreover, not only for the construction structure, but also when two structure bodies are fixed to each other, an adhesive is generally used.

CITATION LIST

Patent Literature

[PTL 1]
 Japanese Unexamined Patent Application Publication No. 2020-062775

SUMMARY OF INVENTION

Technical Problem

However, when manufacturing a structure in which two structure bodies are fixed to each other with an adhesive, it is difficult to accurately fix the two structure bodies to each other. Accordingly, it is difficult to automate the process of fixing the two structure bodies with an adhesive. In addition, the automation of the process would result in high cost.

Moreover, once the two structure bodies are fixed together with an adhesive, it is difficult to make correction later, and it is also difficult to separate the two structure bodies. For example, in a structure in which a base member and a functional layer are fixed with an adhesive, it is difficult to detach the functional layer from the base member.

Moreover, since most of the adhesives are made of petroleum-derived resin materials, the work of fixation with an adhesive itself increases the load on the environment. In addition, in a structure in which a base member and a functional layer are bonded together, even if the functional layer can be detached from the base member, unnecessary adhesive is often adhered to the functional layer, so that the detached functional layer cannot be easily reused or recycled. In this case, incineration of the adhesive layer with the adhesive adhered thereon after detachment also leads to the emission of carbon dioxide gas, which contributes to the greenhouse effect. Accordingly, the method of fixing two structure bodies with an adhesive poses a problem of high environmental load.

In view of the above, techniques for detachably connecting two structure bodies have been studied. For example, relative to a structure including a base member and a functional layer, fitting and connecting the base member and the functional layer together in a detachable manner has been considered. In this case, one of the base member and the functional layer may include a protrusion as a fitting portion, and the other of the base member and the functional layer may include a recess, so that the protrusion and the recess are fitted together to connect the base member and the functional layer, or the protrusion and the recess which are fitted together are detached from each other to separate the base member and the functional layer.

However, in a conventional connection structure in which two structure bodies are detachably connected by fitting a protrusion and a recess that are fitting portions together, it is difficult to achieve both the attachment and detachment performance (ease of fitting and detachment) and the holding performance of the connected state, because the attachment and detachment performance and the holding performance contradict each other and are in a trade-off relationship.

For example, if the attachment and detachment performance is increased by making it easy to fit the protrusion and the recess together or to detach the protrusion and the recess from each other, the holding performance of the connected state is reduced. This makes the two connected connection structure bodies such that they can be easily detached from each other. In other words, after connecting two structure bodies, the two structure bodies may unintentionally become detached from each other. On the other hand, if the holding performance of the connected state is increased, it becomes difficult to fit the protrusion and the recess together or to detach the protrusion and the recess from each other, resulting in a decrease in attachment and detachment performance.

The present invention has been conceived to solve such problems. An object of the present invention is to provide a connection structure which includes two detachable structure bodies each including fitting portions to achieve both the attachment and detachment performance and the holding performance of the connected state, and to provide a decoration method and the like using the connection structure.

Solution to Problem

A connection structure according to one aspect of the present invention includes: a first structure body; and a second structure body which is detachably connected to the first structure body. The first structure body includes a first fitting portion, the second structure body includes a second fitting portion which is detachably fitted with the first fitting portion, at least one of the first fitting portion or the second fitting portion is an anisotropic elastic structure body including a periodic structure and having an elasticity which differs depending on a direction, and when a fitting direction in which the first fitting portion and the second fitting portion are fitted together is a first direction, and a direction which is orthogonal to the first direction is a second direction, the anisotropic elastic structure body has an elasticity which is greater in the second direction than in the first direction.

A decoration method according to one aspect of the present invention includes: performing decoration by using or reusing the connection structure.

A connection structure body set according to one aspect of the present invention includes: a first structure body which includes a first fitting portion; and a second structure body which includes a second fitting portion which is detachably fitted with the first fitting portion. The first structure body and the second structure body are connectable to each other by fitting the first fitting portion and the second fitting portion together, at least one of the first fitting portion or the second fitting portion is an anisotropic elastic structure body including a periodic structure and having an elasticity which differs depending on a direction, and when a fitting direction in which the first fitting portion and the second fitting portion are fitted together is a first direction, and a direction which is orthogonal to the first direction is a second direction, the anisotropic elastic structure body has an elasticity which is greater in the second direction than in the first direction.

Advantageous Effects of Invention

According to the present invention, it is possible to achieve both the attachment and detachment performance and the holding performance of the connected state of two detachable structure bodies each including a fitting portion.

BRIEF DESCRIPTION OF DRAWINGS

FIG. 8 illustrates configurations of the connection structure according to Embodiment 1 and connection structures according to Comparative Examples 1 to 4, and evaluation results of the attachment and detachment performance and the holding performance of each connection structure.

Figure 1:
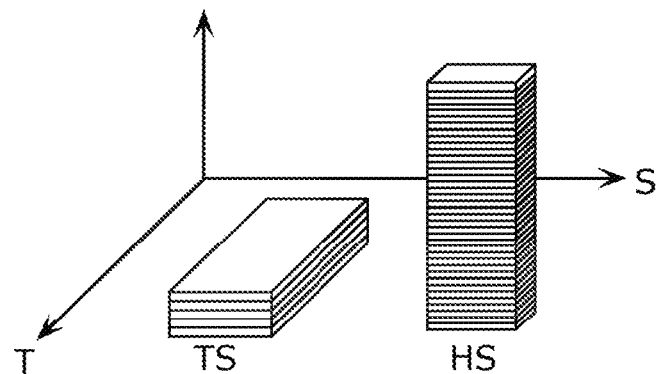
FIG. 1 illustrates configurations of a first test piece and a second test piece produced by a three-dimensional (3D) printer.

DESCRIPTION OF EMBODIMENTS (Circumstances Leading to One Aspect of the Present Invention)

Prior to describing the embodiments of the present invention, the circumstances leading to one aspect of the present invention will be described.

In recent years, three-dimensional (3D) printers have been used to produce three-dimensional structures. A 3D printer is one type of three-dimensional object producing machine, and is a three-dimensional object producing device which uses 3D data created on a computer as a design drawing and produces a three-dimensional structure according to the design drawing.

Various techniques for producing three-dimensional structures with 3D printers in accordance with the characteristics of the materials used are available. As producing methods that use a 3D printer, for example, vat photopolymerization, material jetting, and material extrusion are known. In this case, photocurable resin is used in the vat photopolymerization and the material jetting, and thermoplastic resin is used in the material extrusion.

A 3D printer (3D resin printer) that uses resin as a printing material builds an object by stacking resin layers one by one. For example, in a 3D printer using vat photopolymerization and material jetting, ultraviolet curable resin is used as a printing material, which is ink, and ink is jetted for each layer while ultraviolet light is emitted for curing, and this process is repeated for stacking resin layers. In such a manner, a three-dimensional structure having a predetermined shape is produced. In other words, a three-dimensional structure produced by a 3D resin printer incudes a periodic structure in which a plurality of resin layers are periodically repeated, and is an integrated object in which the interfaces between the resin layers are not bonded with adhesives and are integrated.

Here, focusing on the physical properties of a three-dimensional structure produced by a 3D resin printer, the inventors of the present application actually produced three-dimensional structures by a 3D printer with resin as a printing material, and carried out various experiments.

As a result, the inventors of the present application have found that a three-dimensional structure produced by a 3D printer that uses resin as a printing material has mechanical strength and thermophysical properties which differ between the resin stacking direction (forming direction) and a direction different from the stacking direction. In other words, the inventors have found that the mechanical strength and thermophysical properties of a three-dimensional resin structure produced by a 3D printer have a dependency on the forming direction. The experiments carried out by the inventors of the present application and evaluation results thereof will be described below.

First, as test pieces made of a resin material, three-dimensional cuboid structures were produced by a 3D printer using material jetting. As a printing material, acrylic ultraviolet curable resin was used.

In this case, two kinds of test pieces having the same shape and different resin stacking directions (forming directions) were prepared. Specifically, as illustrated in FIG. 1, first test piece TS and second test piece HS were prepared. In first test piece TS, resin layers were stacked in the direction orthogonal to the longitudinal direction of the cuboid. In second test piece TS, resin layers were stacked in the longitudinal direction of the cuboid. In other words, first test piece TS had a horizontal stacking of resin layers, and second test piece HS had a vertical stacking of resin layers. First test piece TS and second test piece HS were identical to each other in shape.

Although not illustrated, as third test piece RD made of a resin material, a cuboid which is identical to first test piece TS and second test piece HS in shape was produced by a cast molding machine instead of a 3D printer. Third test piece RD was also produced using acrylic UV-curable resin. Since third test piece RD was produced by cast molding, third test piece RD had no resin stacking direction unlike first test piece TS and second test piece HS.

In addition, for each of first test piece TS, second test piece HS, and third test piece RD, a test piece produced by emitting ultraviolet light with a mercury lamp (high energy) and a test piece produced by emitting ultraviolet light with a UV-LED (low energy) were prepared.

In FIG. 1, the lines indicated on each cuboid indicate the boundary lines of the resin layers for the sake of convenience to illustrate the stacking direction of the resin layers. The lines are not actually visible, and the number of boundary lines are not accurate.

In order to evaluate the impact resistance and thermophysical properties (heat resistance) of these test pieces, the following measurements were carried out.

Figure 2:
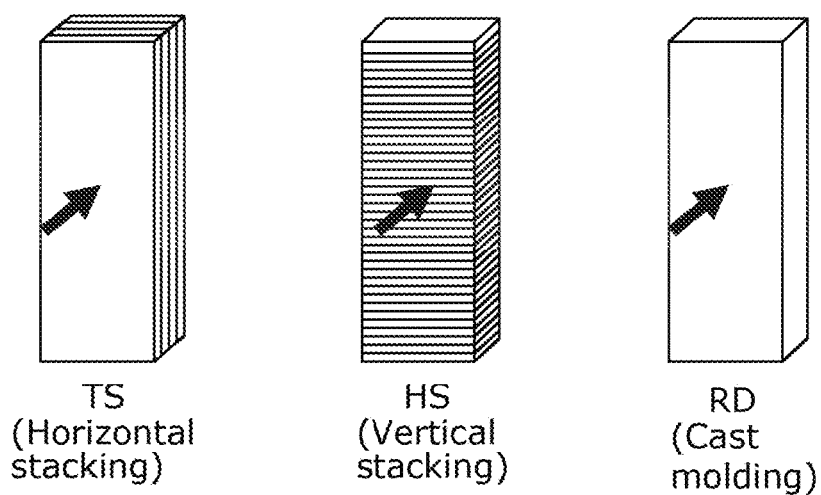
FIG. 2 illustrates directions of impact applied to the first test piece, the second test piece, and a third test piece for an evaluation of impact resistance.

First, in order to evaluate the impact resistance, as illustrated in FIG. 2, an impact was applied to each of first test piece TS (horizontal stacking), second test piece HS (vertical stacking) and third test piece RD (cast molding) from the direction orthogonal to the longitudinal direction of the cuboid, and the Izod impact strength ($kJ/m^2$) was measured as impact resistance. Each arrow in FIG. 2 indicates the impact direction. In other words, the direction of impact on first test piece TS is parallel to the resin stacking direction. The direction of impact on second test piece HS is parallel to the direction orthogonal to the resin stacking direction.

As a result of the measurements, it was found that the Izod impact strength (hereinafter, referred to as "impact strength") of third test piece RD when a mercury lamp was used was equal to when a UV-LED was used. It was also found that the impact strength of each of first test piece TS and second test piece HS produced by a 3D printer was different between when a mercury lamp was used and when a UV-LED was used, and the impact strengths were also different between first test piece TS and second test piece HS.

Specifically, it was found that when the mercury lamp was used, the impact strength of each of first test piece TS and second test piece HS was lower than the impact strength of third test piece RD. In other words, it was found that the test pieces produced by the 3D printer had lower impact resistance. In particular, it was found that the impact strength of first test piece TS was not much lower than the impact strength of third test piece RD, but the impact strength and the impact resistance of second test piece HS were significantly lower than the impact strength and the impact resistance of third test piece RD.

It was found that, when the UV LED was used, the impact strength of each of first test piece TS and second test piece HS produced by the 3D printer was not lower than the impact strength of third test piece RD, and was higher than or equal to the impact resistance of third test piece RD. It was also found that the impact strength of first test piece TS was higher than the impact strength of second test piece HS, and the impact resistance of first test piece TS was higher than the impact resistance of second test piece HS.

Figure 3:
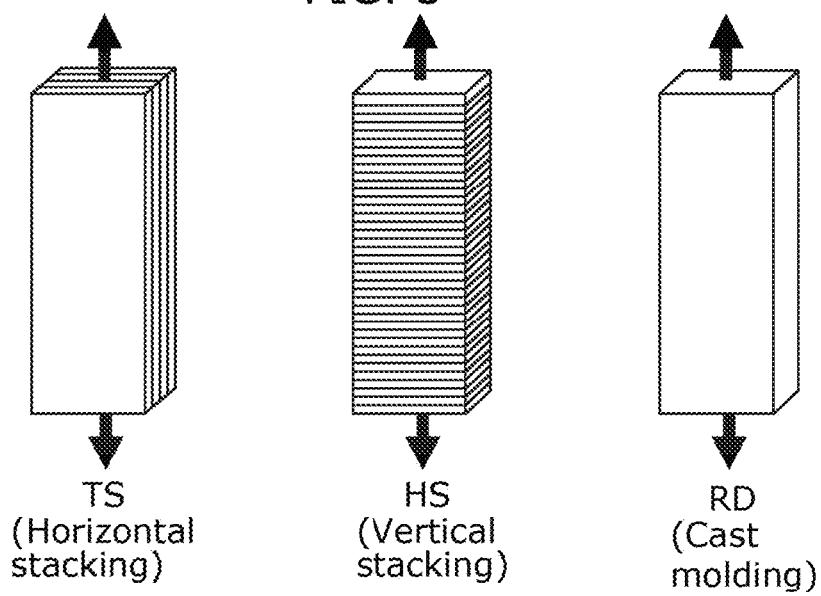
FIG. 3 illustrates directions of tensile stress applied to the first test piece, the second test piece, and the third test piece for an evaluation of thermophysical properties.

Next, in order to evaluate thermophysical properties (heat resistance), as illustrated in FIG. 3, a tensile stress was applied to each of first test piece TS (horizontal stacking), second test piece HS (vertical stacking) and third test piece RD (cast molding) in the longitudinal direction of the cuboid, and the temperature (° C.) and the elastic modulus E(Pa) were measured. Each arrow in FIG. 3 indicates the direction of the tensile stress. In other words, the direction of the tensile stress applied to first test piece TS was parallel to the direction orthogonal to the resin stacking direction, and the direction of the tensile stress applied to second test piece HS was parallel to the resin stacking direction.

As a result of the measurements, it was found that the heat resistance of third test piece RD when a mercury lamp was used was approximately equal to when a UV-LED was used. It was also found that the thermophysical properties of first test piece TS and second test piece HS produced by the 3D printer were different between when the mercury lamp was used and when the UV-LED was used, and that the thermophysical properties were also different between first test piece TS and second test piece HS.

Specifically, it was found that when a mercury lamp was used, the elastic moduli and the heat resistances of first test piece TS and second test piece HS produced by the 3D printer were lower than the elastic modulus and the heat resistance of third test piece RD. In particular, it was found that although the elastic modulus of first test piece TS was lower than the elastic modulus of third test piece RD in the range of 50° C. to 100° C. which is the transition range where the elastic modulus decreases as the temperature increases, the elastic modulus of first test piece TS was not much lower than the elastic modulus of third test piece RD in the range of 0° C. to 50° C. and the range of 100° C. or higher, which are constant ranges where the elastic modulus does not change even when the temperature increases. On the other hand, it was found that the elastic modulus of second test piece HS was lower than the elastic modulus of third test piece RD in any temperature ranges (for example, 0° C. to 150° C.), and was also lower than the elastic modulus of first test piece TS.

Figure 4:
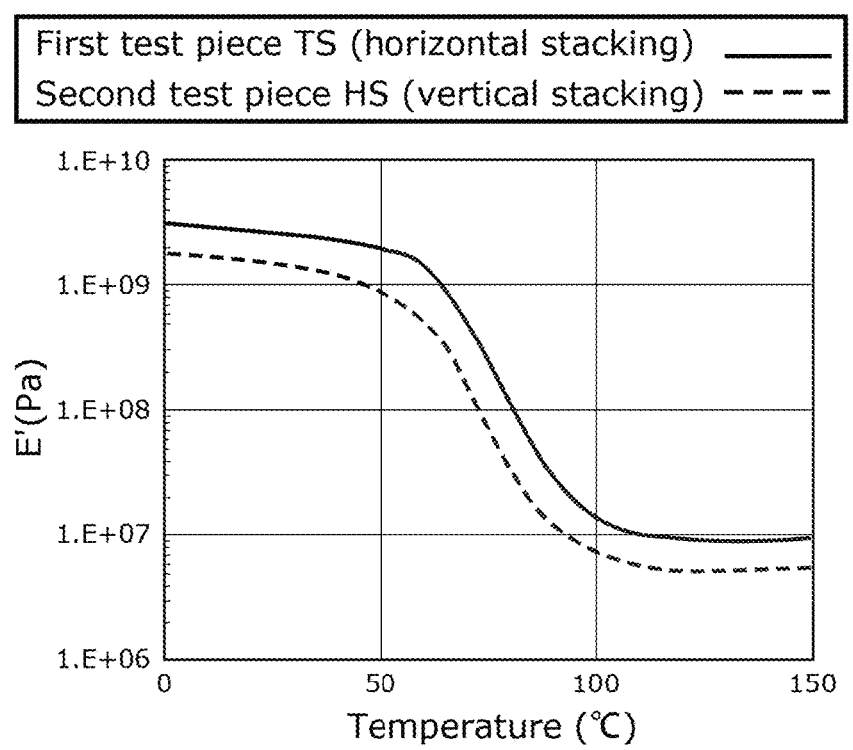
FIG. 4 illustrates directional anisotropy and temperature dependence of elastic modulus in resin structure bodies produced by the 3D printer.

As described above, it was found that the elastic modulus was low when the test piece was produced by the 3D printer, and that the elastic modulus was different between first test piece TS and second test piece HS. In other words, it was found that each of first test piece TS and second test piece HS produced by the 3D printer had elastic anisotropy with respect to the resin stacking direction (forming direction). Specifically, as illustrated in FIG. 4, it was found that the elastic modulus E' of second test piece HS (vertical stacking) was lower than the elastic modulus of first test piece TS (horizontal stacking). In other words, it was found that the elasticity of second test piece HS was higher than the elasticity of first test piece TS. As described above, it was found that the structure formed by the 3D printer had high elasticity (that is, was easily deformed) in the resin stacking direction (forming direction).

In addition, it was found that when the UV-LED was used, the elastic moduli of first test piece TS and second test piece HS produced by the 3D printer were lower than the elastic modulus of third test piece RD in the transition range of 50° C. to 100° C., but were approximately equal to the elastic modulus of third test piece RD in constant ranges which are the range of 0° C. to 50° C. and the range of 100° C. or higher. The elastic modulus curves of first test piece TS and second test piece HS were almost the same, and the elastic moduli of first test piece TS and second test piece HS were approximately equal to each other in any ranges from 0° C. to 100° C.

In other words, it was found that when the UV-LED was used, the elastic moduli of first test piece TS, second test piece HS, and third test piece RD were approximately equal to each other in the range of 0° C. to 50° C. and the range of 100° C. or higher, and that the elasticities of first test piece TS, second test piece HS, and third test piece RD did not have much anisotropy.

As described above, how much the elasticity of each of first test piece TS and second test piece HS produced by the 3D printer was lower than the elasticity of third test piece RD produced by cast molding was different between when the mercury lamp was used and when the UV-LED was used. It is considered that this was because, the energy when ultraviolet light was emitted by the mercury lamp was higher than when the ultraviolet light was emitted by the UV-LED, and resin curing sufficiently progressed in each resin layer, which reduced the bonding at the stacking interface. In contrast, when the UV-LED was used to emit ultraviolet light, it is considered that the energy was low, so that respective resin layers were sequentially stacked while containing uncured components due to oxygen inhibition. This made the interfaces of the resin layers continuous phases and the anisotropy was reduced. As a result, the physical properties became the same as those obtained by cast molding.

In view of the above experimental results, the inventors of the present application have found that when a three-dimensional structure including a periodic structure in which a plurality of resin layers are periodically repeated is produced by a 3D printer, the three-dimensional structure has features that the structure is an integrated object in which the interfaces between the resin layers are integrated without being bonded with an adhesive, and the elastic modulus differs (that is, the elastic properties differ) between the resin stacking direction (forming direction) and the direction orthogonal to the stacking direction. In other words, the inventors have found that a three-dimensional structure formed by a 3D printer using resin has anisotropic elasticity in the resin stacking direction and in the direction orthogonal to the stacking direction.

Based on this knowledge, the inventors of the present application have found, as a connection structure in which two structure bodies are connected, a novel connection structure which is replaced with adhesives and which is excellent in both the attachment and detachment performance and the holding performance which had been conventionally difficult to achieve at the same time. Specifically, the inventors have found a connection structure including a pair of structure bodies excellent in the attachment and detachment performance and the holding performance can be achieved by applying this knowledge to protrusions and/or recesses which are fitted together as fitting portions.

Embodiments of the present invention conceived based on this knowledge will be described below. It should be noted that each of the embodiments described below is a specific example of the present invention. Accordingly, numerical values, structural elements, arrangement positions and connection forms of the structural elements, steps, the order of steps, and the like shown in the following embodiments are examples, and are not intended to limit the present invention. Therefore, among structural elements in the following embodiments, those not recited in any of the independent claims defining the most generic part of the inventive concept are described as optional structural elements.

Note that the drawings are represented schematically, and are not necessarily precise illustrations. Additionally, like reference signs indicate like structural elements in the drawings, and overlapping descriptions thereof are omitted or simplified.

Embodiment 1

Figure 5:
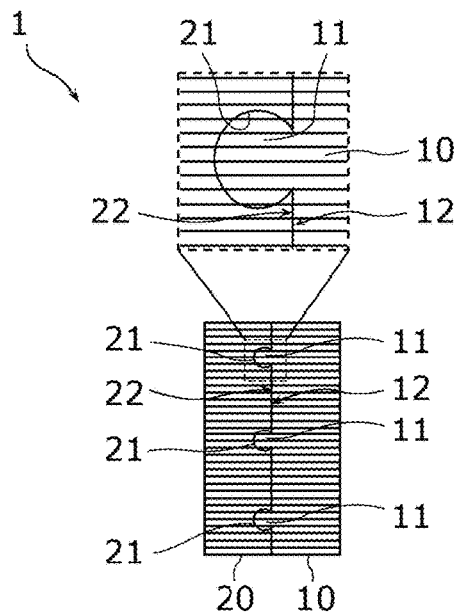
FIG. 5 is a cross-sectional view schematically illustrating a connection structure according to Embodiment 1.
Figure 6:
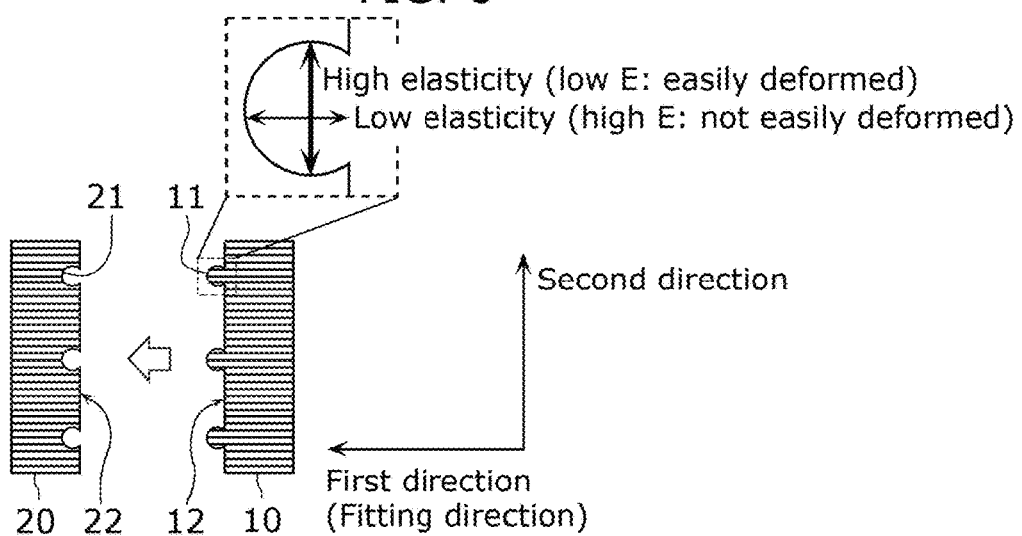
FIG. 6 is a cross-sectional view illustrating a state where a first structure body and a second structure body are connected in the connection structure according to Embodiment 1.

First, a configuration of connection structure 1 according to Embodiment 1 will be described with reference to FIG. 5 and FIG. 6. FIG. 5 is a cross-sectional view schematically illustrating connection structure 1 according to Embodiment 1. FIG. 6 is a cross-sectional view illustrating a state where first structure body 10 and second structure body 20 of connection structure 1 are connected.

As illustrated in FIG. 5, connection structure 1 according to the present embodiment includes first structure body 10 and second structure body 20 which is detachably connected to first structure body 10. First structure body 10 and second structure body 20 form a pair of connection bodies which are detachably connected to each other. In other words, first structure body 10 and second structure body 20 are detachable from each other via a pair of fitting portions (fitting structure) serving as a connection structure, and the user is able to combine or separate first structure body 10 and second structure body 20.

Connection structure 1 according to the present embodiment can be used as a building material. For example, connection structure 1 can be used as a building material, such as a wall material (inner wall material, outer wall material), an interior material, a floor material, a ceiling material, and a partition.

First structure body 10 (first connection body) includes at least one protrusion 11 as a first fitting portion. In the present embodiment, first structure body 10 includes a plurality of protrusions 11. Protrusions 11 are identical to each other in shape.

First structure body 10 is a flat sheet member including main surface 12. Main surface 12 is a surface opposite to second structure body 20. In the present embodiment, main surface 12 of first structure body 10 is flat. The thickness of first structure body 10 excluding protrusions 11 is constant, and the other main surface of first structure body 10 opposite to main surface 12 of first structure body 10 is also flat.

Each of protrusions 11 is a protrusion which protrudes from main surface 12. In the present embodiment, each protrusion 11 is spherical, and is formed such that the base portion of protrusion 11 on main surface 12 side is narrow. Accordingly, the surface of each protrusion 11 is a curved bulging surface, specifically, a convex spherical surface. Specifically, the cross-sectional shape of each spherical protrusion 11 is, for example, a perfect circle or an ellipse, but is not limited to a perfect circle or an ellipse as long as the shape is close to a circle.

First structure body 10 may be made of a material which bends, and be in a shape which allows bending. With this, the attachment and detachment performance between first structure body 10 and second structure body 20 is increased, and connection structure 1 can be easily used for applications such as interior decoration. For example, first structure body 10 can be a flexible sheet. As an example, the thickness of first structure body 10 is at least 0.1 mm and less than 3.0 cm.

First structure body 10 may be a rigid body having rigidity. With this, even if stress, such as an external force, is applied to connection structure 1, deformation of connection structure 1 can be reduced. Accordingly, it is possible to realize connection structure 1 which is not easily deformed by stress.

Second structure body 20 (second connection body) includes, as a second fitting portion, at least one recess 21 which is detachably fitted with protrusion 11 of first structure body 10. In the present embodiment, second structure body 20 includes a plurality of recesses 21. Recesses 21 are identical to each other in shape.

Second structure body 20 is a flat sheet member including main surface 22. In the present embodiment, main surface 22 of second structure body 20 is flat. Main surface 22 is a surface opposite to first structure body 10. The thickness of second structure body 20 excluding recesses 21 is constant, and the other main surface of second structure body 20 opposite to main surface 22 of second structure body 20 is also flat.

Recesses 21 are bottomed holes recessed from main surface 22. Protrusion 11 of first structure body 10 and recess 21 of second structure body 20 form uneven surfaces (male and female structure) that fit together. In other words, protrusion 11 (male structure) and recess 21 (female structure) may be shaped to interlock with each other. Specifically, protrusion 11 and recess 21 may have corresponding shapes in a protrusion and recess relationship. In this case, since protrusion 11 is spherical in the present embodiment, recess 21 is shaped to be recessed spherically so that protrusion 11 fits therein. Accordingly, the surface of recess 21 is a recessed curved surface, specifically a concave spherical surface.

Figure 7:
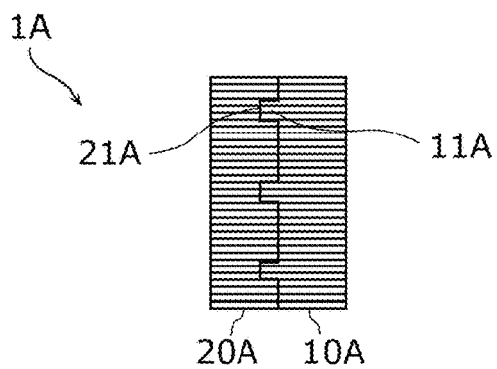
FIG. 7 is a cross-sectional view schematically illustrating a connection structure according to a variation of Embodiment 1.

The shape of each of protrusion 11 and recess 21 is not limited to spherical shape. For example, as illustrated in connection structure 1A of FIG. 7, the shape of each protrusion 11A of first structure body 10A and each recess 21A of second structure body 20A may be prisms. Moreover, protrusion 11A and recess 21A may be cylindrical, or may be frustums having a forward tapered surface or a reverse tapered surface. When protrusion 11A and recess 21A are frustums, protrusion 11A and recess 21A are truncated cones or polygonal truncated pyramids such as triangular truncated pyramids and quadrangular truncated pyramids.

Second structure body 20 is, for example, a rigid body having rigidity. In particular, for example, the rigidity of second structure body 20 is greater than the rigidity of first structure body 10. With this, second structure body 20 can be used as a support for supporting first structure body 10. In this case, second structure body 20 is, for example, thicker than first structure body 10. Although the thickness of second structure body 20 is not particularly limited, it is preferably at least 0.1 mm and less than 3.0 cm, in a similar manner to first structure body 10.

In a similar manner to first structure body 10, second structure body 20 may be made of a material which bends, and be in a shape which allows bending. For example, second structure body 20 may be a flexible sheet in a similar manner to first structure body 10.

As illustrated in FIG. 5, in a state where protrusion 11 and recess 21 are fitted together, the entire surface of protrusion 11 and the entire surface of recess 21 are in close contact with each other. It should be noted that the entire surface of protrusion 11 does not have to be in contact with the entire surface of recess 21 as long as protrusion 11 and recess 21 have shapes that can be fitted together. In other words, a gap may be partially present between the surface of protrusion 11 and the surface of recess 21 in a state where protrusion 11 and recess 21 are fitted together.

Although the number of protrusions 11 does not have to be equal to the number of recesses 21, in the present embodiment, the number of protrusions 11 and the number of recesses 21 are equal to each other, and are on a one-to-one correspondence. Accordingly, protrusions 11 and recesses 21 are formed at positions where protrusions 11 and recesses 21 are all fitted together. For example, as illustrated in FIG. 6, when main surface 12 of first structure body 10 faces main surface 22 of second structure body 20, protrusions 11 and recesses 21 are positioned opposing to each other.

As illustrated in FIG. 6, first structure body 10 and second structure body 20 are connected to each other by fitting protrusions 11 and recesses 21 together. For example, as illustrated in FIG. 6, first structure body 10 and second structure body 20 can be connected by fitting protrusions 11 of first structure body 10 into recesses 21 of second structure body 20 to fit protrusions 11 and recesses 21 together. Specifically, protrusions 11 can be fitted into recesses 21 by inserting protrusions 11 into recesses 21 and pushing protrusions 11 against recesses 21. In FIG. 6, the arrow indicates the fitting direction (insertion direction) in which protrusions 11 are fitted into recesses 21.

In a state where protrusions 11 and recesses 21 are fitted together, first structure body 10 and second structure body 20 have contact portions other than protrusions 11 and recesses 21. In the present embodiment, first structure body 10 and second structure body 20 have portions that are in surface contact with each other in a state where protrusions 11 and recesses 21 are fitted together. Specifically, as illustrated in FIG. 5 and FIG. 6, main surface 12 of first structure body 10 and main surface 22 of second structure body 20 are in surface contact with each other in a state where first structure body 10 and second structure body 20 are connected with protrusions 11 and recesses 21 fitted together. With this configuration, when first structure body 10 and second structure body 20 are connected, first structure body 10 and second structure body 20 are brought into close contact with each other, and the gap between first structure body 10 and second structure body 20 become uniform or approximately uniform. With this, it is possible to realize connection structure 1 in which first structure body 10 and second structure body 20 that are connected are simple in appearance and excellent in design.

In connection structure 1, at least one of protrusion 11 (first fitting portion) and recess 21 (second fitting portion) is an anisotropic elastic structure body including a periodic structure and having an elasticity which differs depending on a direction. In the present embodiment, both protrusion 11 and recess 21 are anisotropic elastic structure bodies. In other words, each of protrusion 11 and recess 21 includes a periodic structure and has elasticity which differs depending on the direction. Recess 21 is an anisotropic elastic structure body means that the peripheral structure of recess 21 is an anisotropic elastic structure body.

Each of protrusion 11 and recess 21, which is an anisotropic elastic structure body, is a one-dimensional periodic structure body made of a multilayer body including a one-dimensional periodic structure as a periodic structure, and is made of one kind of material. Accordingly, each of protrusion 11 and recess 21 includes a repetitive structure periodically repeated only in one direction. In the present embodiment, each of protrusion 11 and recess 21 is formed by a 3D resin printer, and includes a periodic structure in which a plurality of resin layers are periodically repeated by stacking the resin layers. A one-dimensional periodic structure body formed by a 3D resin printer is an integrated body in which interfaces between the resin layers are not bonded with an adhesive.

By forming protrusion 11 and recess 21 by a 3D resin printer, as described above, it is possible to form protrusion 11 and recess 21 each having elasticity which differs between the resin stacking direction and the direction orthogonal to the stacking direction. In other words, each of protrusion 11 and recess 21 is produced under the conditions of a 3D resin printer that make each of protrusion 11 and recess 21 have elasticity which differs between the resin stacking direction and the direction orthogonal to the stacking direction.

Specifically, as illustrated in FIG. 6, when the fitting direction in which protrusion 11 and recess 21 are fitted together is a first direction, and the direction orthogonal to the first direction is a second direction, the elasticity of protrusion 11 and recess 21, which are anisotropic elastic structure bodies, in the second direction is greater than the elasticity of protrusion 11 and recess 21, which are anisotropic elastic structure bodies, in the first direction. In other words, protrusion 11 and recess 21, which are anisotropic elastic structure bodies, have elasticity which is greater in the direction orthogonal to the fitting direction than in the fitting direction. Specifically, the elastic modulus of each of protrusion 11 and recess 21 in the direction orthogonal to the fitting direction is less than the elastic modulus of each of protrusion 11 and recess 21 in the fitting direction. As a result, protrusion 11 and recess 21 are easily deformed in the direction orthogonal to the fitting direction, and are not easily deformed in the fitting direction.

In the present embodiment, the anisotropic elastic structure bodies are not just protrusion 11 and recess 21, but the entirety of each of first structure body 10 and second structure body 20 is the anisotropic elastic structure body. Accordingly, each of entire first structure body 10 and entire second structure body 20 is produced by a 3D resin printer, and includes a periodic structure in which a plurality of resin layers are periodically repeated. Hence, entire first structure body 10 and entire second structure body 20 are made of, for example, ultraviolet curable resin including acrylic resin or the like.

In FIG. 5 and FIG. 6, the hatched lines of first structure body 10 and second structure body 20 indicate the boundary lines of the resin layers for the sake of convenience to illustrate the stacking direction of the resin layers. The lines are not actually visible, and the number of boundary lines is not accurately illustrated.

As described above, in connection structure 1 according to the present embodiment, protrusions 11 and recesses 21 are easily deformed in the direction (second direction) orthogonal to the fitting direction (first direction), and are not easily deformed in the fitting direction (first direction). Hence, in connecting first structure body 10 and second structure body 20 by fitting protrusions 11 into recesses 21, protrusions 11 and recesses 21 are easily elastically deformed in the direction (second direction) orthogonal to the fitting direction when protrusions 11 are inserted into recesses 21. With this, protrusion 11 can be easily fitted into recess 21 to be fitted. In other words, first structure body 10 and second structure body 20 can be easily connected.

In a state where first structure body 10 and second structure body 20 are connected with protrusion 11 fitted into recess 21, when removing protrusion 11 from recess 21, protrusion 11 and recess 21 are easily elastically deformed in the direction orthogonal to the fitting direction. Hence, protrusion 11 can be easily removed from recess 21. In other words, first structure body 10 and second structure body 20 can be easily separated from each other.

Moreover, after fitting protrusion 11 into recess 21, the elasticity (elastic restoring force) of deformed protrusion 11 that tries to revert to its original state acts by closely contacting recess 21 while pressing recess 21, and thus, the frictional resistance between protrusion 11 and recess 21 increases. With this, in a state where first structure body 10 and second structure body 20 are connected to each other with protrusion 11 and recess 21 fitted together, unless protrusion 11 is intentionally removed from recess 21, protrusion 11 is held in recess 21, and is not easily detached from recess 21.

As described above, connection structure 1 according to the present embodiment is excellent in the attachment and detachment performance and the holding performance. In other words, it is possible to provide connection structure 1 capable of achieving both the attachment and detachment performance and the holding performance.

Since experiments were carried out to confirm the advantageous effects of connection structure 1 according to the present embodiment, the results of the experiments will be described below.

In the experiments, with respect to each of the connection structure according to Embodiment 1 and the connection structures according to comparative examples 1 to 4, a first structure body with protrusions and a second structure body with recesses were prepared and the attachment and detachment performance and the holding performance of each connection structure were evaluated.

FIG. 8 illustrates configurations of the connection structure according to Embodiment 1 and the connection structures according to Comparative Examples 1 to 4, and the evaluation results of the attachment and detachment performance and the holding performance of each connection structure. In the experiments, for each of Comparative Examples 1 to 4 and the present embodiment, the diameter of each protrusion was greater than or equal to the diameter of the recess, and the attachment and detachment performance and the holding performance obtained when the protrusion was inserted into the recess were evaluated. Each arrow in FIG. 8 indicates the insertion direction.

In each of the connection structures according to Comparative Examples 1 and 2, both the first structure body with protrusions and the second structure body with recesses were made of the same material, and had isotropic elasticity. In the connection structure according to Comparative Example 1, the protrusions and recesses were prisms, and in the connection structure according to Comparative Example 2, the protrusions and recesses were truncated quadrangular pyramids.

In the connection structures according to Comparative Examples 3 and 4, both the first structure body with protrusions and the second structure body with recesses had isotropic elasticity, and each protrusion was made of a flexible material. In the connection structure according to Comparative Example 3, the protrusions and recesses were prisms, and in the connection structure according to Comparative Example 4, the protrusions and recesses were truncated quadrangular pyramids.

In the connection structure according to the present embodiment, the first structure body with protrusions and the second structure body with recesses were made of the same material, and as described above, had anisotropic elasticity.

In each connection structure, the holding performance was evaluated by the formula of "holding force (N/m$^2$) =elastic modulus (N/m$^2$)×amount of deformation". In this formula, the elastic modulus was defined as the elastic modulus of each protrusion, and the amount of deformation was defined as the amount of displacement of the protrusion in the direction orthogonal to the insertion direction. The elastic modulus of the protrusion was 109 for Comparative Examples 1 and 2 and the present embodiment, and was 107 for Comparative Examples 3 and 4 in which the protrusion was made of a flexible material.

In the experiments, for each connection structure prepared in this way, the ease of inserting the protrusion into the recess, the ease of removing the protrusion from the recess, and the holding force in the state in which the protrusion and the recess were fitted together were evaluated.

As a result, in the connection structure according to Comparative Example 1, each protrusion and each recess were not easily deformed, and the protrusion was isotropically deformed. This made it difficult to insert the protrusion into the recess, so that the protrusion could not be inserted to the bottom of the recess. In addition, in the connection structure according to Comparative Example 1, the holding force was too strong. Hence, once the protrusion was inserted into the recess, it was difficult to remove the protrusion from the recess.

In the connection structure according to Comparative Example 2, since each protrusion and each recess had forward tapered surfaces, the recess and protrusion were easily positioned, and the force was concentrated. Hence, it was easier to insert the protrusion into the recess than in Comparative Example 1, but it was not to the extent that it was easy to insert. On the other hand, since the amount of deformation of the protrusion was slightly less than that in Comparative Example 1, an appropriate holding force was obtained. In addition, since the protrusion and the recess had forward tapered surfaces, when the protrusion was removed from the recess, the vector of the holding force acted in the direction which deviates from the removing direction. This made it easier to remove the protrusion from the recess than in Comparative Example 1.

In the connection structure according to Comparative Example 3, although the protrusion was flexible, the deformation of the protrusion was isotropic, so the protrusion was deformed in the insertion direction as well. As a result, it was difficult to fit the protrusion into the recess, so that it was slightly difficult to insert the protrusion into the recess. In addition, since the protrusion was flexible and had low elastic modulus, the holding force was weak. Moreover, the weak holding force made it easier to remove the protrusion from the recess.

In the connection structure according to Comparative Example 4, each protrusion was flexible, and each protrusion and each recess had forward tapered surfaces. Hence, the positioning of the recess and protrusion was easier than in Comparative Example 3, and the force was concentrated, so that it was easy to insert the protrusion into the recess. In addition, since the protrusion was flexible and had a low elastic modulus, the amount of deformation of the protrusion was less than that in Comparative Example 3. Accordingly, the holding force was quite weak. Therefore, use of the connection structure according to Comparative Example 4 on a place other than the floor surface works against gravity, so that the first structure body or the second structure body may fall. In addition, the weak holding force made it easier to remove the protrusion from the recess.

In the connection structure according to the present embodiment, each of protrusion 11 and recess 21 had elasticity which is greater in the direction orthogonal to the fitting direction than in the fitting direction. In other words, the elastic modulus of each of protrusion 11 and recess 21 was less in the direction orthogonal to the fitting direction than in the fitting direction. Hence, since protrusion 11 and recess 21 were hard in the fitting direction, protrusion 11 and recess 21 could be easily fitted. In addition, protrusion 11 and recess 21 were elastically deformed in a dominant manner in the direction orthogonal to the fitting direction. This made it easy to insert protrusion 11 into recess 21.

Moreover, in the connection structure according to the present embodiment, since protrusion 11 was inserted into recess 21 in an anisotropically deformed state, protrusion 11 and recess 21 having higher elastic moduli than the conventional ones can be used, leading to an increase in the holding force. In other words, the connection structure according to the present embodiment can be structurally designed with a high holding force.

In addition, in the connection structure according to the present embodiment, protrusions 11 and recesses 21 had elastic anisotropy. Hence, when protrusions 11 were removed from recesses 21, protrusions 11 and recesses 21 were elastically deformed in a dominant manner in the direction orthogonal to the removal direction (the direction identical to the fitting direction). Therefore, it was easy to remove the protrusion from the recess.

As described above, connection structure 1 according to the present embodiment includes first structure body 10 and second structure body 20 which is detachably connected to first structure body 10. At least one of protrusion 11 (first fitting portion) of first structure body 10 or recess 21 (second fitting portion) of second structure body 20 is an anisotropic elastic structure body including a periodic structure and having an elasticity which differs depending on a direction. The anisotropic elastic structure body has elasticity which is greater in the direction (second direction) orthogonal to the fitting direction (first direction) of protrusion 11 and recess 21 than in the fitting direction.

With this, at least one of protrusion 11 or recess 21 is easily deformed in the direction (second direction) orthogonal to the fitting direction (first direction), and is not easily deformed in the fitting direction. With this, first structure body 10 and second structure body 20 can be easily attached to and detached from each other, and first structure body 10 and second structure body 20 which are connected can be held with a high holding force. Accordingly, it is possible to realize connection structure 1 capable of achieving both the attachment and detachment performance and the holding performance of the connected state.

Moreover, in connection structure 1 according to the present embodiment, both protrusion 11 and recess 21 are anisotropic elastic structure bodies. In other words, both protrusion 11 and recess 21 have elasticity which is greater in the direction (second direction) orthogonal to the fitting direction (first direction) of protrusion 11 and recess 21 than in the fitting direction.

With this, both protrusion 11 and recess 21 are easily deformed in the direction (second direction) orthogonal to the fitting direction (first direction), and are not easily deformed in the fitting direction. With this, first structure body 10 and second structure body 20 can be more easily attached to and detached from each other, and first structure body 10 and second structure body 20 which are connected can be held with a higher holding force. Accordingly, it is possible to further achieve both the attachment and detachment performance and the holding performance of the connected state.

When only one of protrusion 11 and recess 21 is an anisotropic elastic structure body, it may be that protrusion 11 which is inserted into recess 21 is an anisotropic elastic structure body instead of recess 21 into which protrusion 11 is inserted being an anisotropic elastic structure body.

With this configuration, compared to the case where recess 21 into which protrusion 11 is inserted is an anisotropic elastic structure body, protrusion 11, which is an anisotropic elastic structure body, is easily deformed in the direction (second direction) orthogonal to the fitting direction (first direction), and is not easily deformed in the fitting direction. Accordingly, compared to the case where recess 21 into which protrusion 11 is inserted is an anisotropic elastic structure body, first structure body 10 and second structure body 20 can be easily attached to and detached from each other, and first structure body 10 and second structure body 20 which are connected can be held with a high holding force.

In addition, in connection structure 1 according to the present embodiment, the anisotropic elastic structure body of at least one of protrusion 11 or recess 21 is a multilayer body including a one-dimensional periodic structure as a periodic structure, and is made of one kind of material.

Such an anisotropic elastic structure body, which includes a one-dimensional periodic structure, can be easily produced by a 3D resin printer. In other words, it is possible to produce, by a 3D resin printer, protrusion 11 and/or recess 21, which are anisotropic elastic structure bodies having anisotropic elasticity which differs between the resin stacking direction and the direction orthogonal to the stacking direction.

Moreover, in connection structure 1 according to the present embodiment, first structure body 10 includes a plurality of protrusions 11. In a similar manner, second structure body 20 also includes a plurality of recesses 21.

With this configuration, the number of fitting positions between protrusions 11 and recesses 21 increases, so that unintentional detachment of first structure body 10 from second structure body 20 can be reduced. In other words, the holding performance of connection structure 1 can be increased.

On the other hand, first structure body 10 may include only one protrusion 11. In a similar manner, second structure body 20 may include only one recess 21.

With this configuration, the number of fitting positions between protrusions 11 and recesses 21 is only one, which is the minimum number. This facilitates the work of fitting protrusion 11 and recess 21.

When first structure body 10 includes one protrusion 11 and second structure body 20 includes one recess 21 (that is, when there is only one connection point between first structure body 10 and second structure body 20), it may be that after connecting first structure body 10 and second structure body 20 by fitting protrusion 11 into recess 21, connection structure 1 is rotated about the center of the fitting position (fitting center) between protrusion 11 and recess 21.

With this configuration, even after first structure body 10 and second structure body 20 are connected, first structure body 10 and second structure body 20 are rotated horizontally, which facilitates positioning of first structure body 10 in the rotation direction. In order to rotate first structure body 10 with protrusions 11 fitted into recesses 21, the shapes of protrusions 11 and recesses 21 may be spherical or cylindrical.

When first structure body 10 is rotated, at least one of first structure body 10 or second structure body 20 may include an anti-rotation mechanism (stopper) for stopping the horizontal rotation of first structure body 10. Examples of the anti-rotation mechanism include a magnetic stopper including a pair of magnets and a mechanical stopper including rails, protrusions, or the like.

Such a configuration prevents first structure body 10 from continuously being rotated, so that it is possible to prevent first structure body 10 from wobbling after first structure body 10 is connected to second structure body 20. Moreover, the anti-rotation mechanism facilitates positioning of first structure body 10 and second structure body 20.

On the other hand, even when first structure body 10 includes only one protrusion 11 and second structure body 20 includes only one recess 21, it may be that after protrusion 11 is fitted into recess 21 to connect first structure body 10 and second structure body 20, first structure body 10 is prevented from rotating about the center of the fitting position (fitting center) between protrusion 11 and recess 21.

With this configuration, after first structure body 10 and second structure body 20 are connected, first structure body 10 does not rotate horizontally. Hence, it is possible to prevent first structure body 10 from wobbling after the connection even though there is only one fitting position.

In connection structure 1 according to the present embodiment, the thickness of first structure body 10 in the fitting direction is at least 0.1 mm and less than 3.0 cm.

With this configuration, since the thickness of first structure body 10 can be reduced, it is possible to realize connection structure 1 capable of ensuring a large space.

In this case, in a state where first structure body 10 and second structure body 20 are connected, for example, the thickness of connection structure 1 in the fitting direction is at least 0.5 cm and less than 10 cm.

With this configuration, even in a state where first structure body 10 and second structure body 20 are connected, the total thickness of connection structure 1 can be reduced, so that it is possible to realize connection structure 1 capable of ensuring a large space.

Moreover, since connection structure 1 according to the present embodiment is excellent in the attachment and detachment performance and the holding performance, connection structure 1 can be used as a building material suitable for renovation. In this case, connection structure 1 can be used not only for floor materials but also for wall materials (inner wall materials, outer wall materials) or building materials that are affected by gravity, such as ceilings.

Moreover, in connection structure 1 according to the present embodiment, one of first structure body 10 and second structure body 20 can be easily attached to or detached from the other. Hence, connection structure 1 can be easily repaired or refurbished.

In addition, since one of first structure body 10 and second structure body 20 in connection structure 1 can be easily attached to or detached from the other, the present invention can also be realized as a method of performing decoration by using or reusing connection structure 1. For example, with connection structure 1 used as a building material for a display window, a showcase, or the like of a shop, by simply removing the front side member, which is first structure body 10 or second structure body 20 positioned on the front side, from the back side member positioned on the back side, replacement of only the front side member can be easily performed. With this, decoration such as remodeling can be easily performed.

Moreover, in connection structure 1 according to the present embodiment, one of first structure body 10 and second structure body 20 can be easily attached to or detached from the other, so that automation can be achieved using robots and the like or man-hours can be reduced. This leads to a decoration method capable of resolving labor shortages.

In addition, since no adhesive is required to attach first structure body 10 and second structure body 20 and detach first structure body 10 from second structure body 20, first structure body 10 and/or second structure body 20 can be easily recycled or reused. As a result, it is possible to realize an environment-friendly decoration method with less environmental load.

In this case, in the decoration method, connection structure 1 may be used for renovation. In other words, the decoration method according to the present invention can also be implemented as a method of renovating a house or the like using connection structure 1.

As a result, it is possible to realize a renovation method which is advantageous for automation or man-hour reduction, and which not only eliminates labor shortage but is also environmentally friendly. Accordingly, it is possible to realize a method capable of collectively alleviating recent social problems related to houses, such as response to declining birthrate and super-aging society, working style reforms, and environmental considerations.

The decoration method described above can also be applied to the following embodiments.

Embodiment 2

Figure 9:
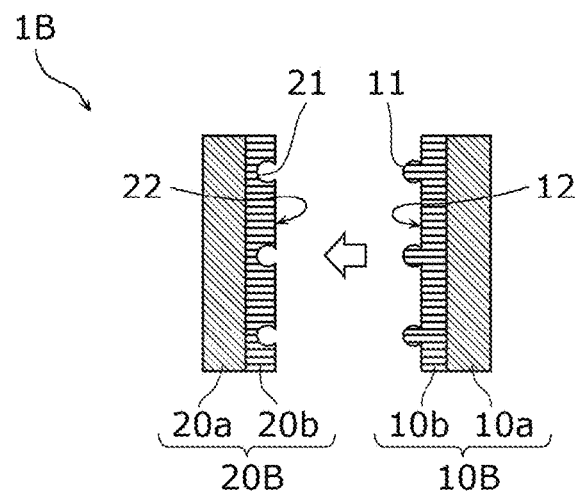
FIG. 9 is a cross-sectional view illustrating a state where a first structure body and a second structure body of a connection structure according to Embodiment 2 are connected.

Next, a configuration of connection structure 1B according to Embodiment 2 will be described with reference to FIG. 9. FIG. 9 is a cross-sectional view illustrating a state where first structure body 10B and second structure body 20B are connected to each other in connection structure 1B according to Embodiment 2.

In connection structure 1 according to Embodiment 1, each of first structure body 10 and second structure body 20 is made of only one member. As illustrated in FIG. 9, in connection structure 1B according to the present embodiment, each of first structure body 10B and second structure body 20B is made of a plurality of members. Specifically, first structure body 10B includes first body layer 10a and first connection layer 10b stacked on first body layer 10a, and second structure body 20B includes second body layer 20a and second connection layer 20b stacked on second body layer 20a.

First body layer 10a is, for example, a substrate that supports first connection layer 10b. In a similar manner, second body layer 20a is, for example, a substrate that supports second connection layer 20b. First body layer 10a and second body layer 20a may have rigidity. In addition, first body layer 10a and second body layer 20a each may be made of a material which bends, and be in a shape which allows bending.

One or both of first body layer 10a and second body layer 20a may be a functional layer having functionality. Examples of the functional layer that is used include a soundproof sheet having soundproof properties, a waterproof sheet having waterproof properties, an antifouling sheet having antifouling properties, a fireproof sheet having fireproof properties, and a sensor sheet with various sensors.

When only one of first body layer 10a and second body layer 20a is a functional layer, either of first structure body 10B or second structure body 20B may be positioned on the outer side (front side). For example, when only first body layer 10a of first structure body 10B is a functional layer, connection structure 1B may be used such that first structure body 10B is positioned on the inner side (back side) and second structure body 20B is positioned on the outer side (front side) or first structure body 10B is positioned on the outer side and second structure body 20B is positioned on the inner side.

One or both of first body layer 10a and second body layer 20a may be a design layer having design properties. As the design layer, for example, a design sheet is used which has a color or pattern such as a wood grain tone or a pictorial pattern.

When only one of first body layer 10a and second body layer 20a is a design layer, it may be that one of first structure body 10B and second structure body 20B which has a design layer is positioned on the outer side (front side). For example, when only first body layer 10a of first structure body 10B is a design layer, connection structure 1B may be used such that first structure body 10B is positioned on the outer side (front side) and second structure body 20B is positioned on the inner side (back side).

Moreover, one of first body layer 10a and second body layer 20a may be a functional layer, and the other of first body layer 10a and second body layer 20a may be a design layer. In this case, when connection structure 1B is used as a building material, connection structure 1B may be used such that one of first structure body 10B and second structure body 20B which has a functional layer is positioned on the inner side (back side), and the other one of first structure body 10B and second structure 20B which has a design layer is positioned on the outer side (front side).

Note that each of first body layer 10a and second body layer 20a may serve as both a functional layer and a design layer.

First body layer 10a may be a support layer which supports first connection layer 10b instead of the functional layer and the design layer. In a similar manner, second body layer 20a may be a support layer which supports second connection layer 20b instead of the functional layer and the design layer. A rigid substrate can be used as a support layer. Even when first body layer 10a and second body layer 20a are support layers, first body layer 10a and second body layer 20a may also serve as functional layers or design layers.

The base members of first body layer 10a and second body layer 20a configured in this way are not anisotropic elastic structure bodies having anisotropic elasticity, but, for example, isotropic elastic structure bodies having isotropic elasticity. For example, the base members of first body layer 10a and second body layer 20a are made of resin, metal, wood, or the like, but are not limited to such examples. One or both of the base members of first body layer 10a and second body layer 20a may be anisotropic elastic structure bodies produced by a 3D printer or the like.

First connection layer 10b of first structure body 10B is a portion of first structure body 10B which is connected to second connection layer 20b of second structure body 20B. First connection layer 10b includes one or more protrusions 11 as first fitting portions.

Second connection layer 20b of second structure body 20B is a portion of second structure body 20B which is connected to first connection layer 10b of first structure body 10B. Second connection layer 20b includes one or more recesses 21 as second fitting portions.

Each of first connection layer 10b and second connection layer 20b is an anisotropic elastic structure body having anisotropic elasticity. For example, each of first connection layer 10b and second connection layer 20b includes a one-dimensional periodic structure having a repetitive structure periodically repeated only in one direction, and is formed by a 3D resin printer. In this case, each of first connection layer 10b and second connection layer 20b includes a periodic structure in which a plurality of resin layers are periodically repeated by stacking the resin layers. By forming first connection layer 10b and second connection layer 20b by a 3D resin printer in such a manner, as described above, it is possible to form first connection layer 10b and second connection layer 20b each having elasticity which differs between the resin stacking direction and the direction orthogonal to the stacking direction. First connection layer 10b and second connection layer 20b, which are anisotropic elastic structure bodies, have elasticity which is greater in a direction (second direction) orthogonal to the fitting direction (first direction) in which protrusion 11 and recess 21 are fitted than in the fitting direction.

As described above, connection structure 1B according to the present embodiment includes: first structure body 10B including first connection layer 10b with protrusions 11 (first fitting portions); and second structure body 20B including second connection layer 20b with recesses 21 (second fitting portions). First connection layer 10b and second connection layer 20b each is an anisotropic elastic structure body including a periodic structure and having an elasticity which differs depending on a direction. First connection layer 10b and second connection layer 20b, which are anisotropic elastic structure bodies, have elasticity which is greater in a direction (second direction) orthogonal to the fitting direction (first direction) in which protrusion 11 and recess 21 are fitted than in the fitting direction.

With this, protrusions 11 of first structure body 10B and recesses 21 of second structure body 20B are easily deformed in the direction (second direction) orthogonal to the fitting direction (first direction), and are not easily deformed in the fitting direction. As a result, first structure body 10B and second structure body 20B can be easily attached to and detached from each other, and first structure body 10B and second structure body 20B which are connected can be held with a high holding force. Accordingly, it is possible to realize connection structure 1B capable of achieving both the attachment and detachment performance and the holding performance of the connected state.

Only one of first connection layer 10b and second connection layer 20b may be an anisotropic elastic structure body. In this case, for example, first connection layer 10b with protrusions 11 to be inserted into recesses 21 may be an anisotropic elastic structure body.

Figure 10:
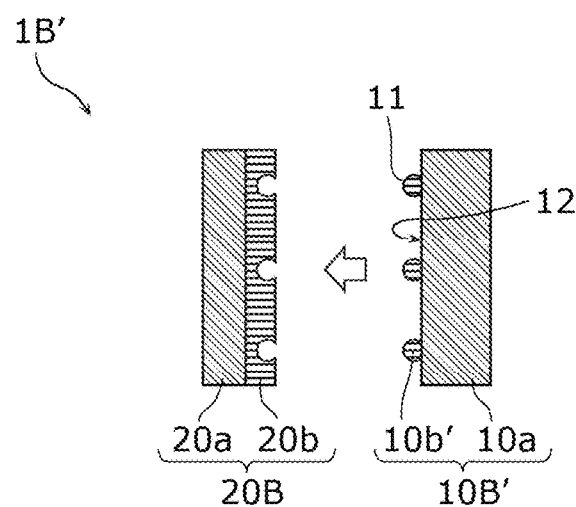
FIG. 10 is a cross-sectional view illustrating a state where a first structure body and a second structure body of a connection structure according to a variation of Embodiment 2 are connected.

As in connection structure 1B' illustrated in FIG. 10, each protrusion 11 of first structure body 10B' may be first connection layer 10b' itself which is an anisotropic elastic structure body. In other words, it may be that main surface 12 of first structure body 10B' is the main surface of first body layer 10a, and the main surface of first body layer 10a includes protrusions 11 each of which is an anisotropic elastic structure body. In such a manner, in first structure body 10B', only protrusions 11 may be anisotropic elastic structure bodies. Connection structure body 1B' having such a configuration is particularly useful as a spatial infrastructure connector. By applying first connection structure body 10B' as a detachable connector to building materials, simple engineering of non-residential buildings can be achieved.

Embodiment 3

Figure 11:
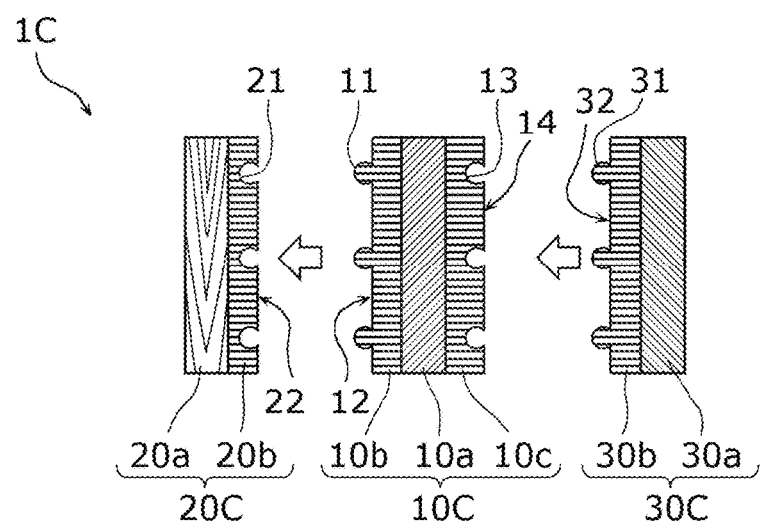
FIG. 11 is a cross-sectional view illustrating a state where a first structure body, a second structure body, and a third structure body of a connection structure according to Embodiment 3 are connected.

Next, a configuration of connection structure 1C according to Embodiment 3 will be described with reference to FIG. 11. FIG. 11 is a cross-sectional view illustrating a state where first structure body 10C, second structure body 20C, and third structure body 30C are connected in connection structure 1C according to Embodiment 3.

Connection structure 1 according to Embodiment 1 includes two structure bodies which are first structure body 10 and second structure body 20. However, connection structure 1C according to the present embodiment includes three structure bodies which are first structure body 10C, second structure body 20C, and third structure body 30C. In other words, connection structure 1C according to the present embodiment includes a configuration in which first structure body 10C, second structure body 20C, and third structure body 30C are detachably connected.

Specifically, connection structure 1C according to the present embodiment includes a configuration in which first structure body 10C is sandwiched between second structure body 20C and third structure body 30C. First structure body 10C and second structure body 20C are detachably connected, and first structure body 10C and third structure body 30C are detachably connected. In other words, first structure body 10C positioned between second structure body 20C and third structure body 30C is detachable from both second structure body 20C and third structure body 30C.

Accordingly, first structure body 10C includes not only the first fitting portions, but also at least one recess 13 as a third fitting portion. In the present embodiment, first structure body 10C includes a plurality of recesses 13. Recesses 13 are identical to each other in shape.

Each of recesses 13 is a bottomed hole recessed from main surface 14 of first structure body 10C which is opposite to main surface 12 of first structure body 10C. In the present embodiment, recesses 13 are identical to recesses 21 of second structure body 20C in shape and size.

As described above, connection structure 1C includes third structure body 30C in addition to first structure body 10C and second structure body 20C.

Third structure body 30C includes, as a fourth fitting portion, at least one protrusion 31 which is detachably fitted into recess 13 (third fitting portion) of first structure body 10C. In the present embodiment, third structure body 30C includes a plurality of protrusions 31. Protrusions 31 are identical to each other in shape.

Each of protrusions 31 is a protrusion which protrudes from main surface 32 of third structure body 30C. In the present embodiment, protrusions 31 are identical to protrusions 11 of first structure body 10C in shape and size.

Third structure body 30C may be made of a material which bends, and be in a shape which allows bending. This increases the attachment and detachment performance between third structure body 30C and first structure body 10C. For example, third structure body 30C can be a flexible sheet. As an example, the thickness of third structure body 30C is at least 0.1 mm and less than 3.0 cm.

Moreover, third structure body 30C may be a rigid body having rigidity. Third structure body 30C is, for example, a support which supports first structure body 10C. With this, even if stress, such as an external force, is applied to connection structure 1C, deformation of connection structure 1C can be reduced. Hence, it is possible to realize connection structure 1C which is not easily deformed by stress.

Moreover, in connection structure 1C according to the present embodiment, each of first structure body 10C, second structure body 20C, and third structure body 30C is made of a plurality of members.

Specifically, first structure body 10C includes first body layer 10a, first connection layer 10b stacked on one surface of first body layer 10a, and third connection layer 10c stacked on the other surface of first body layer 10a.

In a similar manner to second structure body 20B according to Embodiment 2, second structure body 20C includes second body layer 20a and second connection layer 20b stacked on second body layer 20a. Specifically, second connection layer 20b is stacked on the surface of second body layer 20a closer to first structure body 10C.

Third structure body 30C includes third body layer 30a and fourth connection layer 30b stacked on third body layer 30a. Specifically, fourth connection layer 30b is stacked on the surface of third body layer 30a closer to first structure body 10C.

Third body layer 30a is, for example, a substrate which supports fourth connection layer 30b. In this case, third body layer 30a is a rigid sheet. Third body layer 30a may be made of a material which bends, and be in a shape which allows bending.

In a similar manner to first body layer 10a and second body layer 20a, the base member of third body layer 30a is not an anisotropic elastic structure body having anisotropic elasticity, but, for example, is an isotropic elastic structure body having isotropic elasticity. For example, the base member of third body layer 30a is made of resin, metal, wood, or the like, but is not limited to such an example. The base member of third body layer 30a may be an anisotropic elastic structure body formed by a 3D printer or the like.

In a similar manner to first body layer 10a and second body layer 20a, third body layer 30a may be a functional layer having functionality or a design layer having design properties. Third body layer 30a may also be a layer which serves as both a functional layer and a design layer.

In the present embodiment, connection structure 1C is a building material in which second structure body 20C is positioned on the outer side (front side). In this case, for example, outermost second structure body 20C is a design layer, such as a wood grain sheet, innermost third structure body 30C is a support, and middle first structure body 10C is a functional layer. Note that the combination of the functional layer and the design layer in first structure body 10C, second structure body 20C, and third structure body 30C is not limited to such an example.

In a similar manner to Embodiment 2, first connection layer 10b of first structure body 10C is a portion of first structure body 10C which is connected to second connection layer 20b of second structure body 20C. First connection layer 10b includes one or more protrusions 11 as first fitting portions.

Third connection layer 10c of first structure body 10C is a portion of first structure body 10C which is connected to fourth connection layer 30b of third structure body 30C. Third connection layer 10c includes one or more recesses 13 as third fitting portions.

In a similar manner to Embodiment 2, second connection layer 20b of second structure body 20C is a portion of second structure body 20C which is connected to first connection layer 10b of first structure body 10C. Second connection layer 20b includes one or more recesses 21 as second fitting portions.

Fourth connection layer 30b of third structure body 30C is a portion of third structure body 30C which is connected to third connection layer 10c of first structure body 10C. Second connection layer 20b includes one or more protrusions 31 as fourth fitting portions.

Each of first connection layer 10b, second connection layer 20b, third connection layer 10c, and fourth connection layer 30b is an anisotropic elastic structure body having anisotropic elasticity. For example, each of first connection layer 10b and second connection layer 20b includes a one-dimensional periodic structure having a repetitive structure periodically repeated only in one direction, and is formed by a 3D resin printer. In this case, each of first connection layer 10b, second connection layer 20b, third connection layer 10c, and fourth connection layer 30b includes a periodic structure in which a plurality of resin layers are periodically repeated by stacking the resin layers. By forming first connection layer 10b, second connection layer 20b, third connection layer 10c, and fourth connection layer 30b by a 3D resin printer in such a manner, as described above, it is possible to form first connection layer 10b, second connection layer 20b, third connection layer 10c, and fourth connection layer 30b each having elasticity which differs between the resin stacking direction and the direction orthogonal to the stacking direction. Each of first connection layer 10b, second connection layer 20b, third connection layer 10c, and fourth connection layer 30b, which is an anisotropic elastic structure body, has elasticity which is greater in the direction (second direction) orthogonal to the fitting direction (first direction) of protrusions 11 and recesses 21 than in the fitting direction.

As described above, connection structure 1C according to the present embodiment includes: first structure body 10C including first connection layer 10b with protrusions 11 (first fitting portions) and third connection layer 10c with recesses 13 (third fitting portions); second structure body 20C including second connection layer 20b with recesses 21 (second fitting portions); and third structure body 30C including fourth connection layer 30b with protrusions 31 (fourth fitting portions). Each of first connection layer 10b, second connection layer 20b, third connection layer 10c, and fourth connection layer 30b is an anisotropic elastic structure body including a periodic structure and having an elasticity which differs depending on a direction. Each of first connection layer 10b, second connection layer 20b, third connection layer 10c, and fourth connection layer 30b, which is an anisotropic elastic structure body, has elasticity which is greater in the direction (second direction) orthogonal to the fitting direction (first direction) of protrusions 11 and recesses 21 than in the fitting direction.

Accordingly, protrusions 11 and recesses 13 of first structure body 10C and recesses 21 of second structure body 20C and protrusions 31 of third structure body 30C are easily deformed in the direction (second direction) orthogonal to the fitting direction (first direction), and are not easily deformed in the fitting direction. With this, first structure body 10C and second structure body 20C can be easily attached to and detached from each other, and first structure body 10C and third structure body 30C can be easily attached to and detached from each other. In addition, first structure body 10C and second structure body 20C which are connected can be held with a high holding force, and first structure body 10C and third structure body 30C which are connected can be held with a high holding force. Accordingly, it is possible to realize connection structure 1C capable of achieving both the attachment and detachment performance and the holding performance of the connected state.

(Variations)

Although the present invention has been described above based on the embodiments, the present invention is not limited to Embodiments 1 to 3.

For example, in Embodiments 1 to 3, each of the anisotropic elastic structure bodies of protrusion 11 and the peripheral structure of recess 21 is made of a resin material, but the present invention is not limited to such an example. In Embodiments 1 to 3, the anisotropic elastic structure bodies of protrusion 11 and the peripheral structure of recess 21 are produced by a 3D printer, but the present invention is not limited to such an example. Specifically, protrusion 11 and the peripheral structure of recess 21 may be made of a material other than a resin material, and may be produced by a device other than a 3D printer. The same also applies to recesses 13 and protrusions 31.

In Embodiments 1 to 3, each of the anisotropic elastic structure bodies of protrusion 11 and the peripheral structure of recess 21 is a multilayer body including a one-dimensional periodic structure as a periodic structure, and is made of one kind of material. However, the present invention is not limited to such examples.

Figure 12:
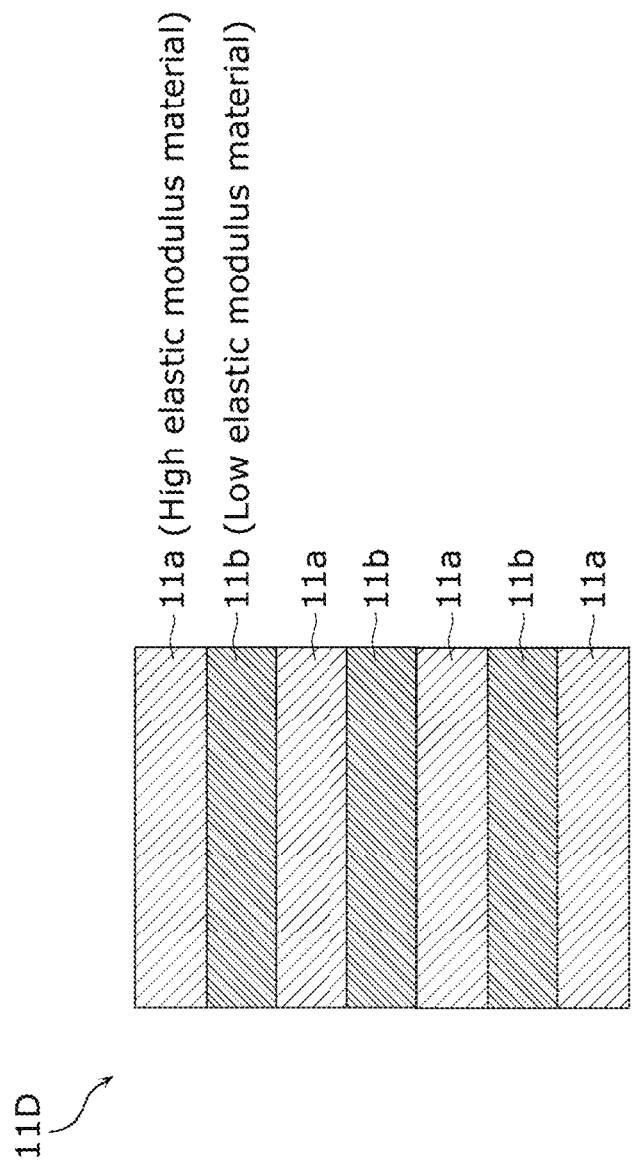
FIG. 12 illustrates a configuration of an anisotropic elastic structure body according to Variation 1.

For example, as illustrated in FIG. 12, the anisotropic elastic structure body of protrusion 11D may be a multilayer body including a one-dimensional periodic structure as a periodic structure, and may be made of a plurality of kinds of materials.

Protrusion 11D in FIG. 12 is an anisotropic elastic structure body made of a plurality of kinds of materials having different elastic moduli. Specifically, protrusion 11D includes a periodic structure in which first layer 11a made of a high elastic modulus material, which is a first material with a high elastic modulus, and second layer 11b made of a low elastic modulus material, which is a second material with a low elastic modulus are alternately and repeatedly stacked. As an example, the high elastic modulus material of each first layer 11a is polycarbonate resin, and the low elastic modulus material of each second layer 11b is thermoplastic polyurethane resin.

In this way, combining materials with different elastic moduli (that is, different elasticities) facilitates designing of the elastic anisotropy in an anisotropic elastic structure body, and the elastic anisotropy can be easily controlled depending on the application.

When protrusion 11 is made of a plurality of materials, entire protrusion 11 may be an anisotropic elastic structure body made of a one-dimensional periodic structure body in which a high elastic modulus material and a low elastic modulus material coexist.

Figure 13:
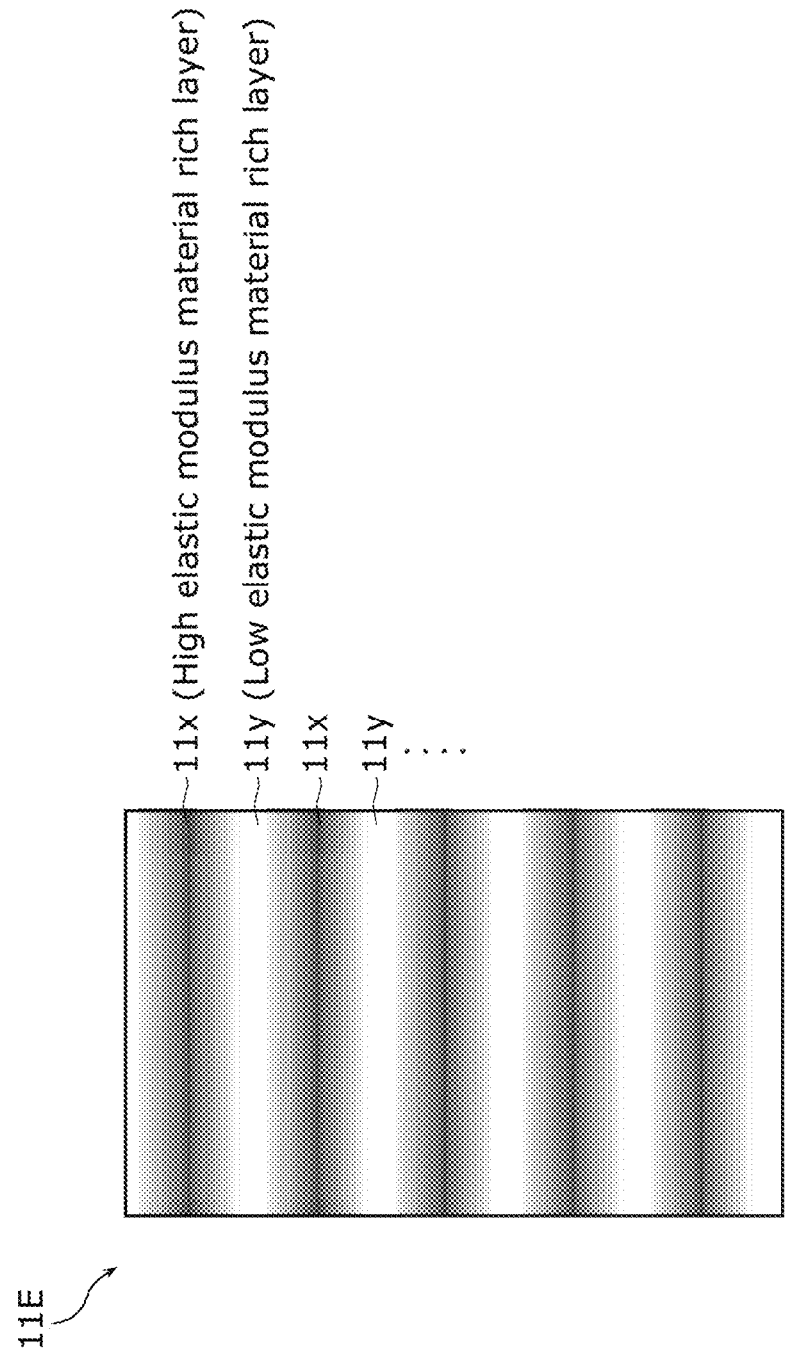
FIG. 13 illustrates a configuration of an anisotropic elastic structure body according to Variation 2.

For example, as in protrusion 11E illustrated in FIG. 13, protrusion 11E may be an anisotropic elastic structure body in which first layer 11x having a higher proportion of high elastic modulus material and second layer 11y having a higher proportion of low elastic modulus material are alternately stacked. Each of first layer 11x and second layer 11y includes both a high elastic modulus material and a low elastic modulus material. First layer 11x is a high elastic modulus material rich layer with a higher content of the high elastic modulus material, and second layer 11y is a low elastic modulus material rich layer having a higher content of low elastic modulus material. The boundary between first layer 11x and second layer 11y includes a continuous phase in which the content of the high elastic modulus material and the content of the low elastic modulus material gradually change by gradation. In other words, protrusion 11E is an anisotropic elastic structure body having layer boundaries with continuous phases.

Moreover, protrusions having such a continuous phase may be made of one kind of material. In this case, the protrusion having a continuous phase and made of one kind of material may include a structure in which a plurality of main layers whose elastic modulus does not change in the stacking direction are repeatedly stacked. The protrusion may be an anisotropic elastic structure body in which a continuous phase having an average elastic modulus different from the elastic modulus of each main layer is interposed between the main layers. In other words, the protrusion may be an anisotropic elastic structure body in which a plurality of main layers and continuous phases are alternately stacked.

The one-dimensional periodic structure bodies illustrated in FIG. 12 and FIG. 13 may be applied not only to protrusions 11 but also to the peripheral structure of recesses 21. The one-dimensional periodic structure illustrated in FIG. 12 and FIG. 13 may be applied not only to protrusions 11 and the peripheral structure of recesses 21 but also to the peripheral structure of recess 13 and protrusion 31.

In Embodiments 1 to 3, the anisotropic elastic structure bodies of protrusion 11 and the peripheral structure of recess 21 are one-dimensional periodic structure bodies each including a one-dimensional periodic structure as a periodic structure, but the present invention is not limited to such an example.

Figure 14:
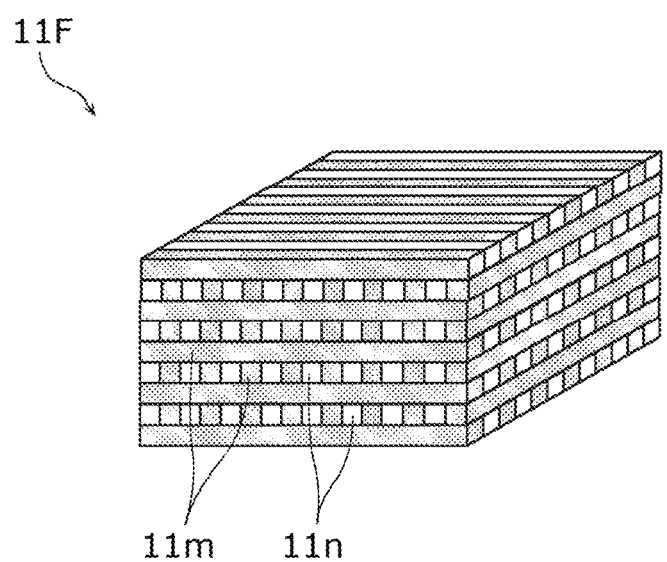
FIG. 14 illustrates a configuration of an anisotropic elastic structure body according to Variation 3.

Specifically, the anisotropic elastic structure bodies of protrusion 11 and the peripheral structure of recess 21 may be two-dimensional periodic structure bodies each including a two-dimensional periodic structure as a periodic structure. As such a two-dimensional periodic structure body, for example, like protrusion 11F illustrated in FIG. 14, the anisotropic elastic structure body of protrusion 11F may be a two-dimensional periodic structure body in which first member 11m made of a high elastic modulus material and second member 11n made of a low elastic modulus material are fitted in parallel crosses. As an example, the high elastic modulus material of first member 11m is polycarbonate resin, and the low elastic modulus material of second member 11n is thermoplastic polyurethane resin. Although a two-dimensional periodic structure body having such a structure can be produced by a 3D printer, it can also be produced by material extrusion or the like. It should be noted that the two-dimensional periodic structure body illustrated in FIG. 14 can be applied not only to the protrusions but also to the peripheral structure of the recesses.

Moreover, although not illustrated, each of the anisotropic elastic structure bodies of the protrusion and the peripheral structure of the recess may include a three-dimensional periodic structure body having a three-dimensional periodic structure as a periodic structure, or a lattice structure body including a lattice structure as a periodic structure in which gratings are arrayed periodically. Such a three-dimensional periodic structure body and lattice structure body can also be produced by a 3D printer. When the anisotropic elastic structure bodies of the protrusion and the peripheral structure of recess are lattice structure bodies, the elastic modulus can be varied depending on the direction by changing the density of the gratings of the lattice structure. In other words, the elasticity can be varied depending on the direction.

Moreover, although not illustrated, all of protrusions 11 are identical to each other in shape in Embodiments 1 to 3, the present invention is not limited to such an example. Specifically, the shapes of protrusions 11 may include two or more different shapes. For example, protrusions 11 may include spherical protrusions and quadrangular prism protrusions. The same also applies to recesses 13, recesses 21 and protrusions 31.

Moreover, in Embodiment 1, only protrusions 11 (male structure) are disposed as the first fitting portions on the same surface of first structure body 10, and only recesses 21 (female structure) are disposed as the second fitting portions on the same surface of second structure body 20, but the present invention is not limited to such an example. For example, it may be that both protrusions and recesses are disposed as the first fitting portions on the same surface of first structure body 10, and both recesses and protrusions are disposed as second fitting portions on the same surface of second structure body 20. In this case, it may be that the protrusions disposed on first structure body 10 and the recesses disposed on second structure body 20 are detachably fitted together, and that the recesses disposed on first structure body 10 and the protrusions disposed on second structure body 20 are detachably fitted together. In such a manner, the protrusions and the recesses may coexist on the same surface of one structure body. The configuration in which protrusions and recesses coexist on the same surface of one structure body may be applied not only to Embodiment 1 but also to Embodiments 2 and 3.

Moreover, in Embodiments 1 and 2, the present invention relates to a connection structure which includes a first structure body and a second structure body, but the present invention is not limited to such an example. For example, the present invention may relate to a connection structure body set which includes a first structure body and a second structure body. In other words, the present invention is applied not only to a connection structure in which the first structure body and the second structure body are connected to each other, but also to a connection structure body set which also includes a state where the first structure body and the second structure body are separated from each other. This also applies to Embodiment 3 described above. In other words, the present invention may relate to a connection structure body set which includes a first structure body, a second structure body, and a third structure body.

In addition, the present invention is not limited to the case where a connection structure or a connection structure body set which includes two structure bodies as in Embodiments 1 and 2 or three structure bodies as in Embodiment 3. The present invention may relate to a connection structure or a connection structure body set in which four or more structure bodies are stacked, as long as the structure bodies can be detachably connected to each other.

Moreover, although it has been described in Embodiments 1 to 3 that the connection structure is applied to building materials in the field of construction, the present invention is not limited to such an example. The connection structure according to the present invention may be applied to uses other than building materials.

In addition, a form obtained by making various modifications conceivable by those skilled in the art to each embodiment and variation, and a form realized by arbitrarily combining the structural elements and functions in each embodiment and variation without departing from the gist of the present invention are also included in the present invention.

The invention claimed is:

1. A connection structure comprising:
a first structure body; and
a second structure body detachably connected to the first structure body,
wherein the first structure body includes a first fitting portion,
the second structure body includes a second fitting portion detachably fitted with the first fitting portion,
at least one of the first fitting portion or the second fitting portion is an anisotropic elastic structure body including a periodic structure and having an elasticity that differs depending on a direction, and
the first fitting portion and the second fitting portion are fittable together is in a first direction orthogonal to a second direction, the anisotropic elastic structure body has an elasticity greater in the second direction than in the first direction.

2. The connection structure according to claim 1, wherein each of the first fitting portion and the second fitting portion is the anisotropic elastic structure body.

3. The connection structure according to claim 1, wherein the anisotropic elastic structure body includes at least one of (i) a multilayer body including a one-dimensional periodic structure as the periodic structure, (ii) a two-dimensional periodic structure body including a two-dimensional periodic structure as the periodic structure, (iii) a three-dimensional periodic structure body including a three-dimensional periodic structure as the periodic structure, or (iv) a lattice structure body including, as the periodic structure, a lattice structure having periodically arrayed gratings.

4. The connection structure according to claim 1, wherein the anisotropic elastic structure body is made of a plurality of kinds of materials having different elastic moduli.

5. The connection structure according to claim 1, wherein the anisotropic elastic structure body is a multilayer body that includes a one-dimensional periodic structure as the periodic structure, and is made of one kind of material.

6. The connection structure according to claim 1, wherein each of the first structure body and the second structure body includes a surface contact portion, the surface contact portion of the first structure body being in surface contact with the surface contact portion of the second structure body as the first fitting portion and the second fitting portion are fitted together.

7. The connection structure according to claim 1, wherein the first structure body includes a plurality of first fitting portions each of the first fitting portion.

8. The connection structure according to claim 1, wherein at least one of the first structure body or the second structure body is made of a material that bends, and is in a shape that allows bending.

9. The connection structure according to claim 1, further comprising:
a third structure body,
wherein the first structure body includes a third fitting portion, and
the third structure body includes a fourth fitting portion detachably fitted with the third fitting portion.

10. The connection structure according to claim 9, wherein the third structure body supports the first structure body.

11. The connection structure according to claim 1, wherein the first structure body includes:
a functional layer that has functionality; and
a first connection layer stacked on the functional layer and includes the first fitting portion.

12. The connection structure according to claim 1, wherein the second structure body includes: a design layer having a design property; and a second connection layer stacked on the design layer and includes the second fitting portion.

13. The connection structure according to claim 1, wherein a thickness of the first structure body in the first direction is at least 0.1 mm and less than 3.0 cm.

14. The connection structure according to claim 1, wherein the connection structure is a building material.

15. A decoration method comprising:
performing decoration by using or reusing the connection structure according to claim 1.

16. The decoration method according to claim 15, comprising:
performing renovation by using the connection structure.

17. A connection structure body set comprising:
a first structure body that includes a first fitting portion; and
a second structure body that includes a second fitting portion detachably fitted with the first fitting portion,
wherein the first structure body and the second structure body are connectable to each other by fitting the first fitting portion and the second fitting portion together,
at least one of the first fitting portion or the second fitting portion is an anisotropic elastic structure body including a periodic structure and having an elasticity that differs depending on a direction, and
the first fitting portion and the second fitting portion are fittable together in a first direction orthogonal to a second direction, the anisotropic elastic structure body has an elasticity greater in the second direction than in the first direction.

* * * * *